United States Patent
He

(10) Patent No.: US 10,241,927 B2
(45) Date of Patent: Mar. 26, 2019

(54) LINKED-LIST-BASED METHOD AND DEVICE FOR APPLICATION CACHING MANAGEMENT

(71) Applicant: SHENZHEN SKYWORTH-RGB ELECTRONIC CO., LTD., Shenzhen (CN)

(72) Inventor: Rui He, Shenzhen (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 100 days.

(21) Appl. No.: 15/414,628

(22) Filed: Jan. 25, 2017

(65) Prior Publication Data

US 2017/0262368 A1 Sep. 14, 2017

Related U.S. Application Data

(63) Continuation of application No. PCT/CN2016/076296, filed on Mar. 14, 2016.

(30) Foreign Application Priority Data

Mar. 14, 2016 (CN) .......................... 2016 1 0145066

(51) Int. Cl.
*G06F 12/00* (2006.01)
*G06F 12/123* (2016.01)

(52) U.S. Cl.
CPC .... *G06F 12/123* (2013.01); *G06F 2212/1024* (2013.01); *G06F 2212/1044* (2013.01); *G06F 2212/171* (2013.01); *G06F 2212/502* (2013.01)

(58) Field of Classification Search
CPC ............ G06F 12/0804; G06F 2212/60; G06F 2212/502; G06F 2212/1024; G06F 2212/1044; G06F 2212/171
(Continued)

(56) References Cited

U.S. PATENT DOCUMENTS

| 2004/0123019 | A1 * | 6/2004 | Garney | G06F 8/60 |
| | | | | 711/102 |
| 2009/0049237 | A1 * | 2/2009 | Sivakumar | G06F 12/0813 |
| | | | | 711/113 |

(Continued)

FOREIGN PATENT DOCUMENTS

| CN | 104850507 | * | 8/2015 | |
| WO | WO-2017156683 A1 | * | 9/2017 | ......... G06F 12/0871 |

OTHER PUBLICATIONS

Machine Translation CN104850507.*

*Primary Examiner* — Hong C Kim
(74) *Attorney, Agent, or Firm* — W&K IP

(57) ABSTRACT

A linked-list-based method for application caching management is disclosed, the method including: when receiving application cached data, creating a node in a linked list for the cached data and obtaining a memory size of the cached data; obtaining a maximum memory size and a currently occupied memory size of the linked list; adding the memory size of the received cached data to the currently occupied memory size of the linked list to obtain a first memory size; and adding the node to the linked list if the first memory size is smaller than or equal to the maximum memory size. A linked-list-based device for application caching management is also provided.

12 Claims, 8 Drawing Sheets

(58) Field of Classification Search
USPC ..... 711/56, 170, 118, 216; 710/56; 707/206, 707/747
See application file for complete search history.

(56) References Cited

U.S. PATENT DOCUMENTS

2012/0265776 A1* 10/2012 Wang ................ G06F 17/30902
707/758
2016/0004644 A1* 1/2016 Samanta ............. G06F 12/0804
711/3

* cited by examiner

LINKED-LIST-BASED METHOD AND DEVICE FOR APPLICATION CACHING MANAGEMENT

CROSS-REFERENCE TO RELATED APPLICATIONS

This application is a continuation of International Patent Application No. PCT/CN2016/076296 with a filing date of Mar. 14, 2016, designating the United States, now pending, and further claims priority to Chinese Patent Application No. 201610145066.9 with a filing date of Mar. 14, 2016. The content of the aforementioned application, including any intervening amendments thereto, are incorporated herein by reference.

TECHNICAL FIELD

Embodiments of the present disclosure relate generally to storage technology, and more particularly relate to a linked-list-based method and device for application caching management.

BACKGROUND OF THE PRESENT INVENTION

Mobile terminals now have access to increasingly abundant applications along with the rapid development of mobile communication technology. In the application development process of the iOS, the cache is used for storage of a variety of application data to serve the purpose of high-speed data access.

Currently, iOS platform employing the NSCache (a class, the iOS introduces for convenient caching of some objects) memory cache mechanism, however, there is no strict limit on the memory size of the cached data. That is, only after new cached data is stored such that the total amount of the currently stored cached data exceeds the memory limit, the iOS platform will delete the last stored cached data that overflows from the limit. With such storage strategy, the total memory size of the cached data may be likely to overrun the system memory limit after new cached data is stored, resulting in low storage speed and efficiency.

SUMMARY OF PRESENT INVENTION

A linked-list-based method and device for application caching management are provided, aiming at solving the prior art issue that on the iOS platform employing NSCache the total amount of cached data may overrun the system memory limit in the new cached data storage process thus resulting in low storage speed and efficiency.

There is provided a linked-list-based method for application caching management, the method including:
creating a node in a linked list for received application cached data and obtaining a memory size of the received application cached data;
obtaining a maximum memory size of the linked list and a currently occupied memory size of the linked list;
adding the memory size of the received cached data to the currently occupied memory size of the linked list to derive a first memory size; and
adding the node to the linked list if the first memory size is smaller than or equal to the maximum memory size.

The method may further include, after adding the memory size of the received cached data to the currently occupied memory size of the linked list:
if the first memory size is larger than the maximum memory size, obtaining a time interval between last access time of each node in the linked list and present time;
deleting the node having the largest time interval from the linked list;
adding the memory size of the received cached data to the currently occupied memory size of the linked list after the node is deleted to derive a second memory size; and
adding the node to the linked list if the second memory size is smaller than or equal to the maximum memory size.

The method may further include, after adding the node to the linked list if the first memory size is smaller than or equal to the maximum memory size:
when receiving a cached-data access request, obtaining identification information of the cached data associated with the access request; and
traversing the linked list based on the identification information to access the cached data associated with the access request.

The method may further include, after traversing the linked list based on the identification information:
setting the corresponding node of the accessed cached data as the head node of the linked list.

The data field of the node may contain a survival duration of the node, and the method may further include, after adding the node to the linked list if the first memory size is smaller than or equal to the maximum memory size:
determining based on the time of creation of the node whether the node currently reaches the survival duration; and
deleting the node if the node has reached the survival duration.

There is provided a linked-list-based device for application caching management, the device including:
a creation module configured to create a node in a linked list for received application cached data and obtaining a memory size of the received application cached data;
a first acquisition module configured to obtain a maximum memory size of the linked list and a currently occupied memory size of the linked list;
a first computation module configured to add the memory size of the received cached data to the currently occupied memory size of the linked list to derive first memory size; and
a first addition module configured to add the node to the linked list if the first memory size is smaller than or equal to the maximum memory size.

The device may further include:
a second acquisition module configured to obtain a time interval between last access time of each node in the linked list and present time, if the first memory size is larger than the maximum memory size;
a first deletion module configured to delete the node having the largest time interval from the linked list;
a second computation module configured to add the memory size of the received cached data to the currently occupied memory size of the linked list after the node is deleted to derive a second memory size; and
a second addition module configured to add the node to the linked list if the second memory size is smaller than or equal to the maximum memory size.

The device may further include:
a third acquisition module configured to obtain, when receiving a cached, data access request, identification information of the cached data associated with the access request; and a traversal module configured to traverse the linked list based on the identification information to access the cached data associated with the access request.

The device may further include a setting module configured to set the corresponding node of the accessed cached data as the head node of the linked list.

The data field of the node may contain a survival duration of the node, and the device may further include:

a determination module configured to determine whether the node currently reaches the survival duration based on the time of creation of the node; and a second deletion module configured to delete the node if the node has reached the survival duration.

To summarize, according to the present disclosure upon receiving of application cached data a node would be created in a linked list for the cached data and a memory size of the cached data would be obtained. Then the maximum memory size and the currently occupied memory size of the linked list may be obtained, and the memory size of the received cached data may be added to the currently occupied memory size of the linked list to obtain a first memory size. Finally, if the first memory size is smaller than or equal to the maximum memory size, the node would be added to the linked list. The received cached data therefore can be added to the linked list if the first memory size is not greater than the maximum memory size, thus avoiding that in the new cached data storage process the cached data may overrun the maximum memory size of the linked list and so improving the cached data storage speed and efficiency.

The objects, features and advantages of the present disclosure will be obvious from the description rendered in further detail with reference to the accompanying drawings.

DETAILED DESCRIPTION OF PREFERRED EMBODIMENTS

It is to be appreciated that the specific embodiments described herein are for illustration purposes only and are not intended to be limiting the scope of the present disclosure.

Figure 1:
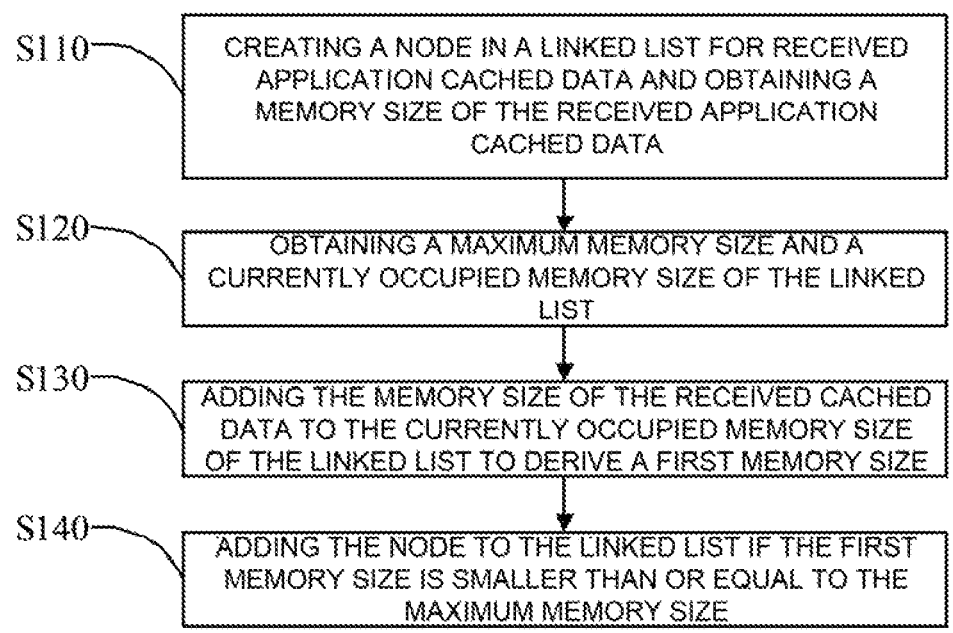
FIG. 1 depicts a flowchart illustrating a first embodiment of a linked-list-based method for application caching management according to the disclosure.

The present invention provides a linked-list-based method for application caching management. Referring to FIG. 1, a flowchart is depicted illustrating a first embodiment of a linked-list-based method for application caching management according to the disclosure. The method according to this embodiment may include the following blocks.

In S110, when cached data is received from an application, a node may be created in a linked list accordingly, and a memory size of the received cached data may be obtained.

The linked list can be a doubly linked list or a singly linked list. The linked list node can be created by storing the cached data to the data field of the newly created node, where the immediate successor of the newly created node is the head node of the current linked list. At the same time, the memory size of the received cached data can be obtained, and can be, e.g., 50M etc. The method according to the present embodiment can be applied, for example, to an iOS platform such as one that is used to develop a variety of applications for mobile terminals. The method may then proceed to block S120.

In S120, a maximum memory size of the linked list and a currently occupied memory size of the linked list may be obtained.

The maximum memory size of the linked list is the maximum capacity of the linked list set at the time of creation, while the currently occupied memory size of the linked list refers to the memory size of the cached data currently stored altogether in the linked list. The method may then continue to block S130.

In S130, the memory size of the received cached data may be added to the currently occupied memory size of the linked list to derive a first memory size. The method then may proceed to block S140.

In S140, the linked list node may be added to the linked list if the first memory size is smaller than or equal to the maximum memory size.

If the first memory size is smaller than or equal to the maximum memory size, it may indicate the currently stored cached data has not yet exceeded the maximum capacity of the linked list, so that the node can be added to the linked list, or more specifically, the linked list node can be added to the linked list as the head node of the linked list.

According to the present embodiment, when receiving application cached data a node may be created in a linked list for the cached data and a memory size of the cached data may be obtained. Then the maximum memory size and the currently occupied memory size of the linked list may be obtained, and the memory size of the received cached data may be added to the currently occupied memory size of the linked list to obtain a first memory size. And finally if the first memory size is smaller than or equal to the maximum memory size, the node would be added to the linked list. The received cached data therefore can be added to the linked list if the first memory size is not greater than the maximum memory size, thus avoiding that in the new cached data storage process the amount of cached data may overrun the maximum memory size of the linked list and so improving the cached data storage speed and efficiency.

Figure 2:
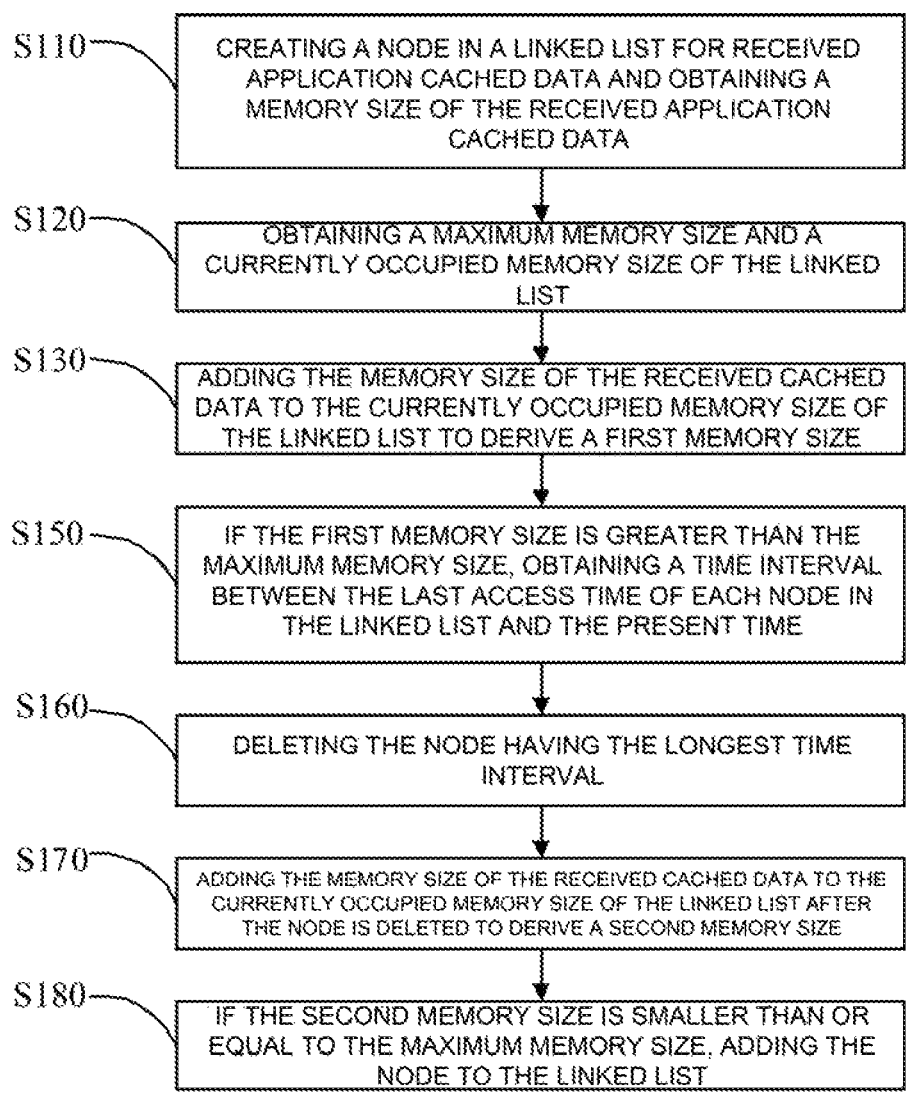
FIG. 2 depicts a flowchart illustrating a second embodiment of the linked-list-based method for application caching management according to the disclosure.

Referring now to FIG. 2, a flowchart is depicted illustrating a second embodiment of the linked-list-based method for application caching management. The second embodiment will be described below on the basis of the first embodiment above and may further include the following blocks after S130 of the first embodiment.

In S150, if the first memory size is larger than the maximum memory size, a time interval between last access time of each node in the linked list and the present time may be obtained.

The last access time of each node refers to the time when the node is being accessed the last time. The method then may proceed to block S160.

In S160, the node having the largest time interval may be deleted from the linked list.

The node having the largest time interval, i.e., the node that has the longest period of time from the time it is lastly accessed to the present time, or in other words, the node that has not been visited for the longest duration, would be deleted from the linked list. The method may then continue to block S170 and S180.

In S170, the memory size of the received cached data may be added to the currently occupied memory size of the linked list after the node is deleted to derive a second memory size.

In S180, the node may be added to the linked list if the second memory size is smaller than or equal to the maximum memory size.

After the node with the largest time interval is deleted from the linked list, if the second memory size is smaller than or equal to the maximum memory size, i.e., the sum of the currently occupied memory size of the linked list and the memory size of the received cached data is smaller than the maximum memory size of the linked list, then the node may be added to the linked list, and specifically, the node may be added to the linked list as the head mode of the linked list.

According to the present embodiment, if the first memory size is larger than the maximum memory size, the time interval between the last access time of each node in the linked list and the present time may be obtained, and the node with the largest time interval may be deleted from the linked list. Then the memory size of the received cached data may be added to the currently occupied memory size of the linked list after the node is deleted to derive a second memory size. So if the second memory size is smaller than or equal to the maximum memory size, the node would be added to the linked list. Therefore, if the first memory size is larger than the maximum memory size, the node having the largest time interval or, in other words, having not been visited for the longest period of time will be deleted from the linked list in order that the second memory size would be smaller than or equal to the maximum memory size, and so the node will be able to add to the linked list, avoiding that in the new cached data storage process the cached data may overrun the maximum memory size of the linked list, thus improving the cached data storage speed and efficiency.

Figure 3:
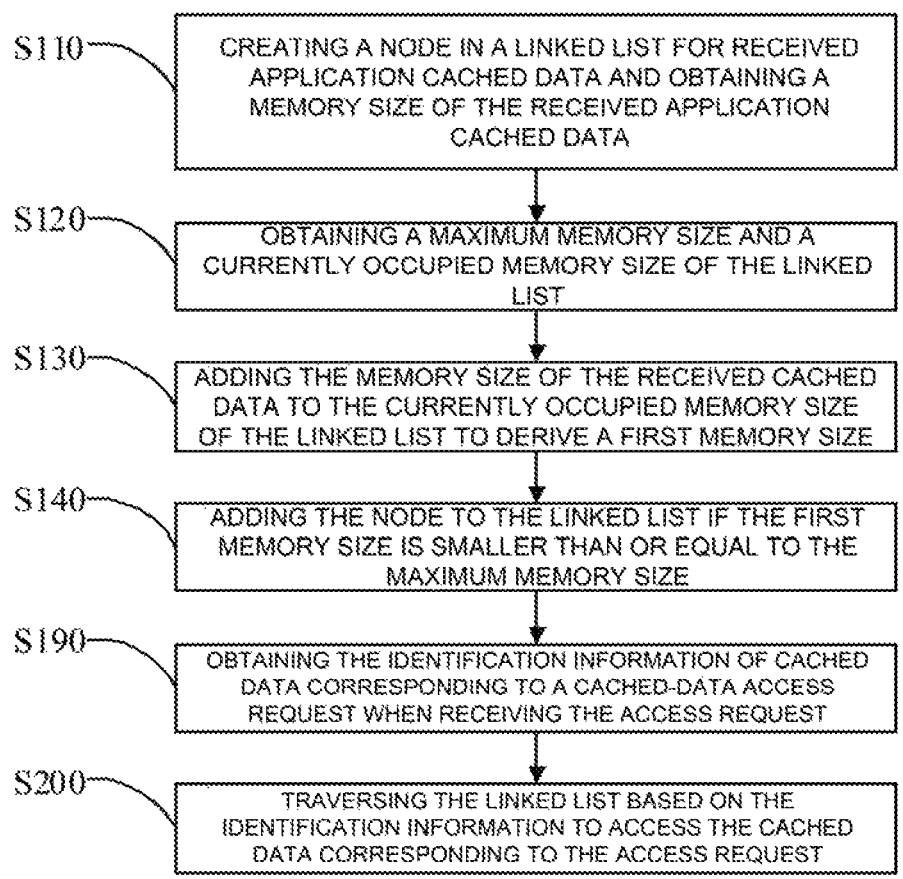
FIG. 3 depicts a flowchart illustrating a third embodiment of the linked-list-based method for application caching management according to the disclosure.

Referring now to FIG. 3, a flowchart is depicted illustrating a third embodiment of the linked-list-based method for application caching management. The third embodiment will be described below on the basis of the first embodiment above and may further include the following blocks after S140 of the first embodiment.

In S190, when a cached-data access request is received, the identification information of the cached data associated with the access request may be obtained.

In the process of developing various applications for mobile terminals on the iOS platform, an access request to the cached data can be generated when the cached data in the linked list needs to be called, where the access request may carry the identification information of the requested cached data, so when receiving the access request, the access request can be parsed to derive the identification information of the cached data corresponding to the access request. The method may then proceed to block S200.

In S200, the linked list may be traversed based on the identification information to access the cached data corresponding to the access request.

After obtaining the identification information of the cached data, the linked list may be traversed based on the identification information to access the cached data corresponding to the access request. However, the current iOS platform employing NSCache needs to compare the identification information with the cached data keys one by one for a match, so if a legion of cached data keys are similar to each other, or in other words, if there are a large number of similar keys, then the system may take a relatively large amount of time on comparison and matching, leading to low cached data read performance, i.e., low cached data read speed and efficiency.

In other embodiments, the method may further include, after block S200: setting the corresponding node of the accessed cached data as the head node of the linked list.

Therefore, the corresponding node of the retrieved cached data may be set as the head node of the linked list, so that if the first memory size is greater than the maximum memory size when new cached data is subsequently received, the tail node would be deleted. Then the memory size of the received cached data may be added to the currently occupied memory size of the linked list to derive the second memory size. If, finally, the second memory size is smaller than or equal to the maximum memory size, the node would be added to the linked list. Hence the cached data storage process can be reduced when the first memory size is greater than the maximum memory size, resulting in enhanced cached data storage speed and efficiency.

According to the present embodiment, when a cached-data access request is received, the identification information of the cached data corresponding to the access request may be obtained. The linked list can then be traversed based on the identification information to retrieve the cached data corresponding to the access request. Hence the traversal of the linked list based on the identification information of the cached data can allow the retrieval of the cached data, improving the cached data read speed and efficiency.

Figure 4:
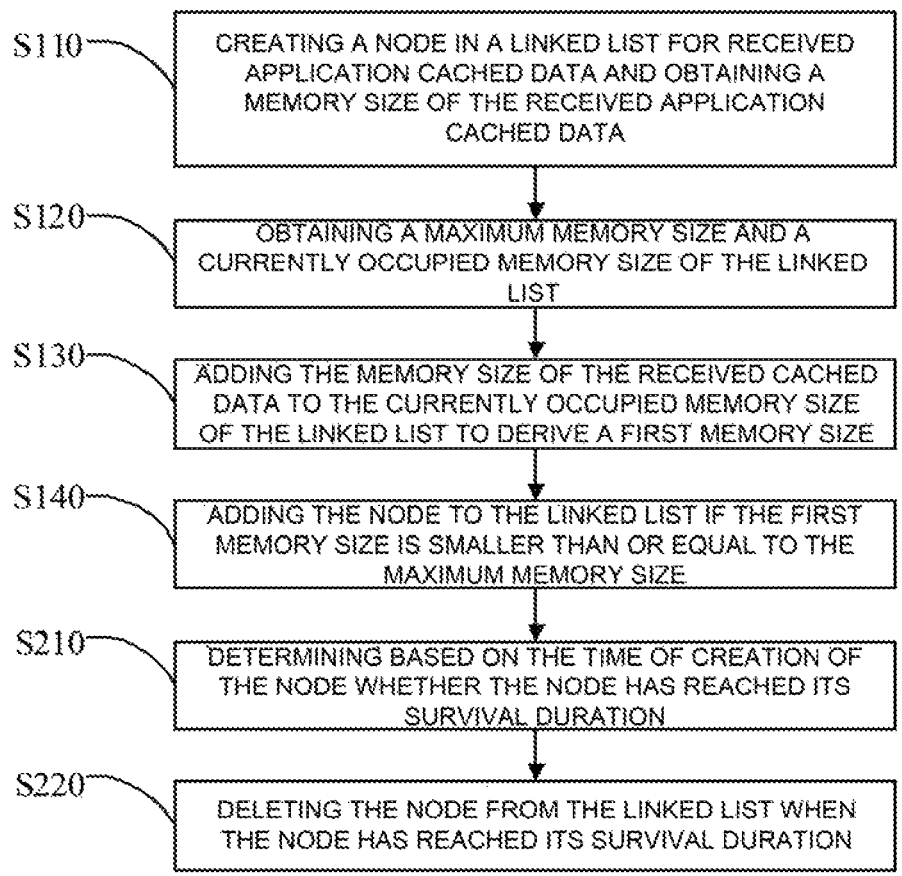
FIG. 4 depicts a flowchart illustrating a fourth embodiment of the linked-list-based method for application caching management according to the disclosure.

Referring now to FIG. 4, a flowchart is depicted illustrating a fourth embodiment of the linked-list-based method for application caching management which will be described below on the basis of the first embodiment above and which may further include the following blocks after S140 of the first embodiment.

In S210, the method may include determining whether the linked list node currently reaches a survival duration based on the time of creation of the node.

When storing the cached data, the data field of the node created may contain the survival duration of the node, and a timer may be started right after the linked list node is added to the linked list in order to determine subsequently whether the node reaches the survival duration. The method may then proceed to block S220.

In S220, if the node has reached the survival duration, then the node may be deleted from the linked list.

According to the present embodiment, the time of creation of the linked list node may be taken as a reference time point to determine whether the node has reached the survival duration, and the node would be deleted when it has reached the survival duration. Hence the nodes in the linked list can be deleted on a survival-duration basis, and therefore the cached data can be stored for only a certain period of time which further improves the cached data access efficiency.

Figure 5:
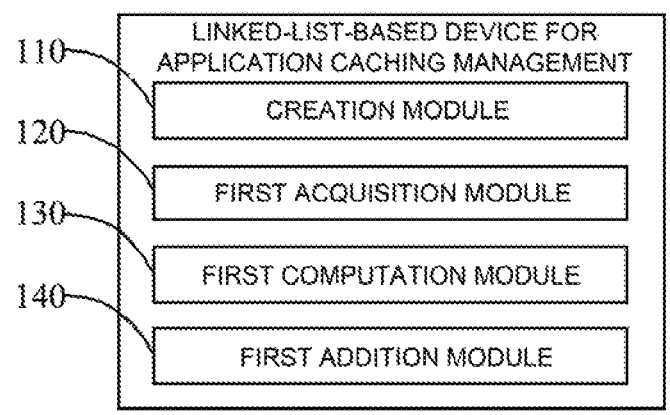
FIG. 5 is a block diagram illustrating a first embodiment of a linked-list-based device for application caching management according to the disclosure.

The present invention further provides a linked-list-based device for application caching management. Referring now to FIG. 5, a block diagram is depicted illustrating a first embodiment of a linked-list-based device for application caching management according to the disclosure. The device according to this embodiment may include a creation module 110, a first acquisition module 120, a first computation module 130, and a first addition module 140.

Creation module 110 may be configured to create a node in a linked list for received application cached data and obtain a memory size of the received application cached data.

The linked list can be a doubly linked list or a singly linked list. The linked list node can be created by storing the cached data to the data field of the newly created node, where the immediate successor of the newly created node is the head node of the current linked list. At the same time, the memory size of the received cached data can be obtained, and can be, e.g., 50M, etc. The device according to the present embodiment can be applied, for example, to an iOS platform such as one that is used to develop various applications for mobile terminals.

The first acquisition module 120 may be configured to obtain a maximum memory size of the linked list and a currently occupied memory size of the linked list.

The maximum memory size of the linked list is the maximum capacity of the linked list set at the time of creation, while the currently occupied memory size of the linked list refers to the memory size of the cached data currently stored altogether in the linked list.

The first computation module 130 may be configured to add the memory size of the received cached data to the currently occupied memory size of the linked list to derive a first memory size.

The first addition module 140 may be configured to add the node to the linked list if the first memory size is smaller than or equal to the maximum memory size.

If the first memory size is smaller than or equal to the maximum memory size, it may indicate the currently stored cached data has not yet exceeded the maximum capacity of the linked list, so that the first addition module 140 may add the node to the linked list, or more specifically, set the linked list node as the head node of the linked list.

According to the present embodiment, when receiving application cached data the creation module 110 may create a node in a linked list for the cached data and obtain a memory size of the cached data. Then the first acquisition module 120 may obtain the maximum memory size and the currently occupied memory size of the linked list, and the first computation module 130 may add the memory size of the received cached data to the currently occupied memory size of the linked list to obtain the first memory size. And finally if the first memory size is smaller than or equal to the maximum memory size, the first addition module 140 may add the node to the linked list. The received cached data therefore can be added to the linked list if the first memory size is not greater than the maximum memory size, thus avoiding that in the new cached data storage process the amount of cached data may overrun the maximum memory size of the linked list and so improving the cached data storage speed and efficiency.

Figure 6:
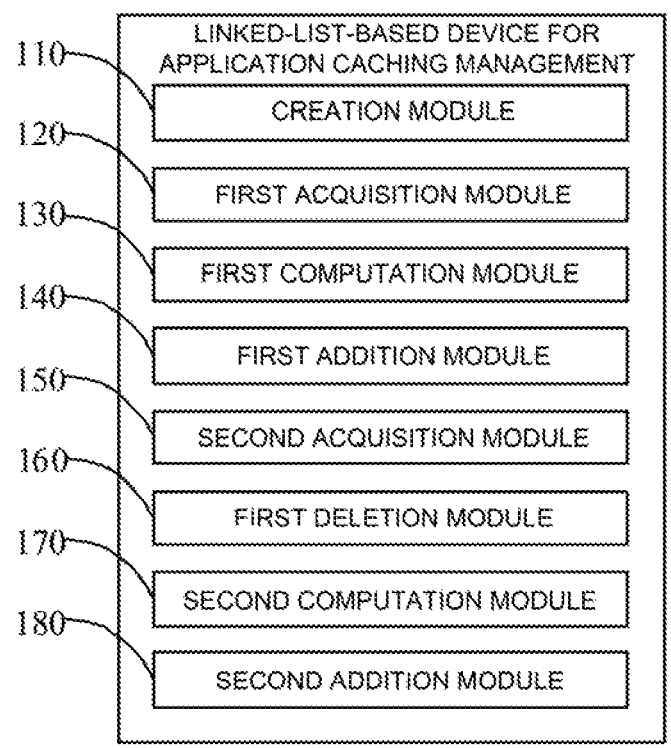
FIG. 6 is a block diagram illustrating a second embodiment of a linked-list-based device for application caching management according to the disclosure.

Referring now to FIG. 6, a block diagram is depicted illustrating a second embodiment of the linked-list-based device for application caching management according to the disclosure. The second embodiment device will be described below on the basis of the first embodiment device illustrated above and may further include a second acquisition module 150, a first deletion module 160, a second computation module 170, and a second addition module 180.

The second acquisition module 150 may be configured to obtain a time interval between last access time of each node in the linked list and present time, if the first memory size is larger than the maximum memory size.

The last access time of each node in the linked list refers to the time when the node is being accessed the last time.

The first deletion module 160 may be configured to delete the node having the largest time interval from the linked list.

The node having the largest time interval, referring to the node that has the longest period of time from the time it is lastly accessed to the present time, i.e., the node that has not been visited for the longest duration, would be deleted from the linked list.

The second computation module 170 may be configured to add the memory size of the received cached data to the currently occupied memory size of the linked list after the node is deleted to derive a second memory size.

The second addition module 180 may be configured to add the node to the linked list if the second memory size is smaller than or equal to the maximum memory size.

After the node with the largest time interval is deleted from the linked list, if the second memory size is smaller than or equal to the maximum memory size, i.e., the sum of the currently occupied memory size of the linked list and the memory size of the received cached data is smaller than the maximum memory size of the linked list, then the second addition module 180 may add the node to the linked list, and specifically, add and set the node as the head node of the linked list.

According to the present embodiment, if the first memory size is larger than the maximum memory size, the second acquisition module 150 may obtain the time interval between the last access time of each node in the linked list and the present time, and the first deletion module 160 may delete the node with the largest time interval from the linked list. Then the second computation module 170 may add the memory size of the received cached data to the currently occupied memory size of the linked list after the node is deleted to derive the second memory size. So if the second memory size is smaller than or equal to the maximum memory size, the second addition module 180 may add the linked list node to the linked list. Therefore, if the first memory size is larger than the maximum memory size, the node having the largest time interval or, in other words, having not been accessed for the longest period of time will be deleted from the linked list in order that the second memory size would be smaller than or equal to the maximum memory size, and so the linked list node will be able to add to the linked list, avoiding that in the new cached data storage process the cached data may overrun the maximum memory size of the linked list, thus improving the cached data storage speed and efficiency.

Figure 7:
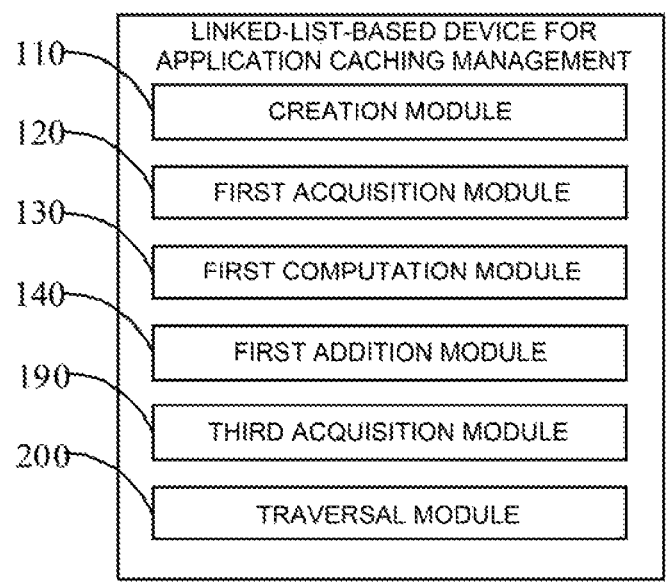
FIG. 7 is a block diagram illustrating a third embodiment of a linked-list-based device for application caching management according to the disclosure.

Referring now to FIG. 7, a block diagram is depicted illustrating a third embodiment of the linked-list-based device for application caching management. The third embodiment device will be described below on the basis of the first embodiment device above and may further include a third acquisition module 190, and a traversal module 200.

The third acquisition module 190 may be configured to obtain, when receiving a cached-data access request, identification information of the cached data corresponding to the access request.

In the process of developing various applications for a mobile terminal on the iOS platform, an access request to the cached data can be generated when the cached data in the linked list needs to be called, where the access request may carry the identification information of the requested cached data, so when the cached-data access request is received, the third acquisition module 190 may parse the access request to derive the identification information of the cached data corresponding to the access request.

The traversal module 200 may be configured to traverse the linked list based on the identification information to retrieve the cached data corresponding to the access request.

After obtaining the identification information of the cached data, the linked list may be traversed based on the identification information to access the cached data associated with the access request. However, the current iOS platform employing NSCache needs to compare the identification information with the cached data keys on one-by-one basis for a match, so if a legion of cached data keys are similar to each other, or in other words, if there are a large number of similar keys, then the system may take a relatively large amount of time on comparison and matching, leading to low cached data read performance, i.e., low cached data read speed and efficiency.

In other embodiments, the device may further include a setting module configured to set the corresponding node of the accessed cached data as the head node of the linked list.

Therefore, the setting module can set the corresponding node of the retrieved cached data as the head node of the linked list, so that if the first memory size is greater than the maximum memory size when new cached data is subsequently received, the tail node would be deleted. Then the memory size of the received cached data may be added to the currently occupied memory size of the linked list to derive the second memory size. If, finally, the second memory size is smaller than or equal to the maximum memory size, the linked list node will be added to the linked list. Hence the cached data storage process can be reduced when the first memory size is greater than the maximum memory size, resulting in enhanced cached data storage speed and efficiency.

According to the present embodiment, when a cached-data access request is received, the third acquisition module 190 may obtain the identification information of the cached data corresponding to the access request. Then the traversal module 200 may traverse the linked list based on the identification information to retrieve the cached data associated with the access request. Hence the traversal of the linked list based on the identification information of the cached data can allow the retrieval of the cached data, thus improving the cached data read speed and efficiency.

Figure 8:
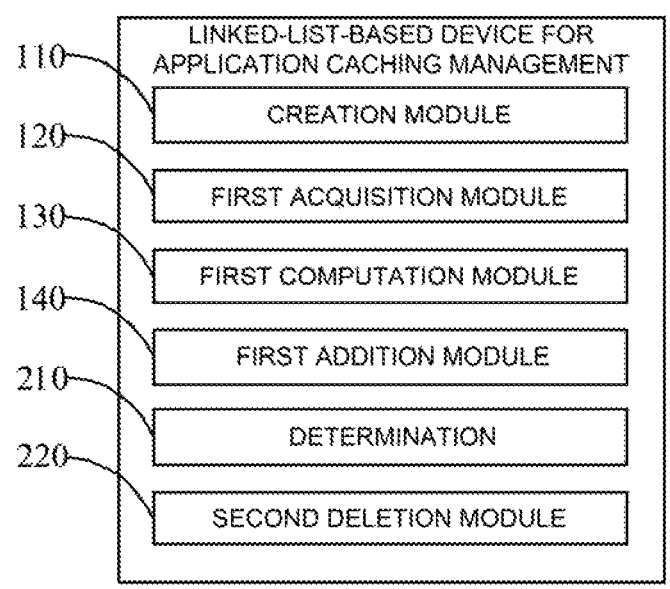
FIG. 8 is a block diagram illustrating a fourth embodiment of a linked-list-based device for application caching management according to the disclosure.

Referring now to FIG. 8, a block is depicted illustrating a fourth embodiment of the linked-list-based device for application caching management, which will be described below on the basis of the first embodiment device previously illustrated and which may further include a determination module 210 and a second deletion module 220.

The determination module 210 may be configured to determine whether the linked list node currently reaches the survival duration based on the time of creation of the node.

When storing the cached data, the data field of the linked list node created may contain the survival duration of the node, and a timer may be started right after the linked list node is added to the linked list for subsequent determination as to whether the node reaches the survival duration.

The second deletion module 220 may be configured to delete the node if the node has reached its survival duration.

According to the present embodiment, the determination module 210 may base on the time of creation of the linked list node to determine whether the node currently has reached the survival duration, and the second deletion module 220 may delete the node when it has reached its survival duration. Hence the nodes in the linked list can be deleted on a survival-duration basis, and therefore the cached data can be stored for only a certain period of time which further improves the cached data access efficiency.

It is to be noted that the term "including", "comprising", or any other variation thereof is intended to encompass a non-exclusive inclusion herein so that a process, method, article, or device including/comprising a set of elements includes not only the stated elements, but also other elements not expressly listed, or elements inherent to such processes, methods, articles, or devices. In the absence of further limitations, the element defined by the phrase "including/comprising one . . . " does not preclude the presence of additional identical elements in the process, method, article, or device that includes the element.

The embodiments of the present disclosure have been described for purposes of illustration only and are not intended to be limiting the scope of the disclosure.

It will be apparent to those skilled in the art from the foregoing description that the above-described embodiments may be implemented by means of software plus the necessary general-purpose hardware platform—although hardware can be used—but the former would be advantageous in many cases. On the basis of such an understanding, the substantial technical solution, or the part which contributes to the prior art, or all or part of the technical solution, of the disclosure, may be embodied as software products. Computer software products can be stored in a storage medium, e.g., a ROM/RAM, magnetic disk, or optical disk, and can include multiple instructions causing a computing device, e.g., a mobile phone, a computer, a server, a conditioner, a network device, etc., to execute all or part of the methods as described in various embodiments herein.

Furthermore, it is apparent to those skilled in the art that the present disclosure also provides a linked-list-based device for application caching management, the device including a non-transitory program storage medium and one or more processors. The non-transitory program storage medium stores program code executable by the processor(s) to perform the methods as described above. Furthermore, it is apparent to those skilled in the art that various units or modules 110, 120, 130, 140, 150, 160, 170, 180, 190, 200, 210, and 220, as shown in FIGS. 5-8, can be software modules or software units. In another aspect, it is well-known that various software modules or software units can be inherently stored in the non-transitory program storage medium and executed by the processor(s).

The foregoing specification merely depicts some exemplary embodiments of the present disclosure and therefore is not intended as limiting the scope of the disclosure. Any equivalent structural or flow transformations made to the disclosure, or any direct or indirect applications of the disclosure on any other related fields, shall all fall in the protection of the disclosure.

I claim:

1. A linked-list-based method for application caching management, the method comprising:
   creating a node in a linked list according to received application cached data and obtaining a memory size of the received application cached data;
   obtaining a maximum memory size and a currently occupied memory size of the linked list;
   adding the memory size of the received cached data and the currently occupied memory size of the linked list to obtain a first memory size; and adding the node to the linked list when the first memory size is smaller than or equal to the maximum memory size;

obtaining identification information of cached data corresponding to a received cached-data access request; and traversing the linked list to access the cached data corresponding to the access request based on the identification information.

2. The method according to claim 1, further comprising, after adding the memory size of the received cached data to the currently occupied memory size of the linked list:

obtaining a time interval between last access time of each node in the linked list and present time, if the first memory size is larger than the maximum memory size;

deleting the node having the largest time interval from the linked list;

adding the memory size of the received cached data to the currently occupied memory size of the linked list after the node is deleted to derive a second memory size; and adding the created node to the linked list if the second memory size is smaller than or equal to the maximum memory size.

3. The method according to claim 2, wherein data field of the node contains a survival duration of the node, and the method further comprises, after adding the node to the linked list:

determining whether the node currently reaches the survival duration based on the time of creation of the node; and deleting the node if the node has reached the survival duration.

4. The method according to claim 1, further comprising, after traversing the linked list to access the cached data corresponding to the access request based on the identification information:

setting the corresponding node of the accessed cached data as head node of the linked list.

5. The method according to claim 4, wherein data field of the node contains a survival duration of the node, and the method further comprises, after adding the node to the linked list:

determining whether the node currently reaches the survival duration based on the time of creation of the node; and deleting the node if the node has reached the survival duration.

6. The method according to claim 1, wherein data field of the node contains a survival duration of the node, and the method further comprises, after adding the node to the linked list:

determining whether the node currently reaches the survival duration based on the time of creation of the node; and deleting the node if the node has reached the survival duration.

7. A linked-list-based device for application caching management, the device comprising one or more processors and a non-transitory program storage medium containing program code executable by the processor(s), the program code comprising:

a creation module, configured to create a node in a linked list according to received application cached data and obtaining a memory size of the received application cached data, a first acquisition module, configured to obtain a maximum memory size and a currently occupied memory size of the linked list;

a first computation module, configured to add the memory size of the received cached data and the currently occupied memory size of the linked list to obtain a first memory size, and a first addition module, configured to add the node to the linked list when the first memory size is smaller than or equal to the maximum memory size;

a third acquisition module configured to obtain identification information of cached data corresponding to a received cached-data access request, and a traversal module configured to traverse the linked list to access the cached data corresponding to the access request based on the identification information.

8. The device according to claim 7, wherein the program code further comprises:

a second acquisition module configured to obtain a time interval between last access time of each node in the linked list and present time if the first memory size is larger than the maximum memory size;

a first deletion module configured to delete the node having the largest time interval from the linked list;

a second computation module configured to add the memory size of the received cached data to the currently occupied memory size of the linked list after the node is deleted to derive a second memory size; and a second addition module configured to add the created node to the linked list if the second memory size is smaller than or equal to the maximum memory size.

9. The device according to claim 8, wherein data field of the node contains a survival duration of the node, and the program code further comprises:

a determination module configured to determine whether the node currently reaches the survival duration based on the time of creation of the node; and a second deletion module configured to delete the node if the node has reached the survival duration.

10. The device according to claim 7, wherein the program code further comprises:

a setting module configured to set the corresponding node of the accessed cached data as head node of the linked list.

11. The device according to claim 10, wherein data field of the node contains a survival duration of the node, and the program code further comprises:

a determination module configured to determine whether the node currently reaches the survival duration based on the time of creation of the node; and a second deletion module configured to delete the node if the node has reached the survival duration.

12. The device according to claim 7, wherein data field of the node contains a survival duration of the node, and the program code further comprises:

a determination module configured to determine whether the node currently reaches the survival duration based on the time of creation of the node; and a second deletion module configured to delete the node if the node has reached the survival duration.

* * * * *